United States Patent [19]

Rajadurai

[11] Patent Number: 5,562,888
[45] Date of Patent: Oct. 8, 1996

[54] NITROUS OXIDE DECOMPOSITION USING A SOLID OXIDE SOLUTION

[75] Inventor: Sivanandi Rajadurai, Columbus, Ind.

[73] Assignee: Cummins Engine Company, Inc., Columbus, Ind.

[21] Appl. No.: 446,022

[22] Filed: May 19, 1995

[51] Int. Cl.[6] .................................................. B01J 8/00
[52] U.S. Cl. ........................................................ 423/239.1
[58] Field of Search .............................. 423/239.1, 235

[56] References Cited

PUBLICATIONS

Raj et al., "The Activity of $Mn^{3+}$ and $Mn^{4+}$ in Larthanum Strontium Manganite for the Decomposition of Nitrous Oxides"; Journal of Catalysis; May 1982 pp. 185–187.

Primary Examiner—Steven Bos
Assistant Examiner—Thomas G. Dunn, Jr.
Attorney, Agent, or Firm—Woodard, Emhardt, Naughton, Moriarty & McNett

[57] ABSTRACT

Catalytic decomposition of nitrous oxide in the presence of oxygen is achieved using a solid oxide solution of the formula:

$$La_{0.8}Sr_{0.2}MO_{3\pm\partial}$$

where:
  M is a transition metal, and is preferably selected from the group consisting of Cr, Mn, Fe, Co and Y; and
  $\partial$ is the deviation from stoichiometric balance; or:

$$La_{1.8}Sr_{0.2}CuO_{4\pm\partial}$$

where:
  $\partial$ is the deviation from stoichiometric balance. The solid oxide solution catalyst exhibits catalytic activity for nitrous oxide decomposition which rivals or exceeds that of dispersed noble metals on alumina.

4 Claims, 5 Drawing Sheets

LOT curves of percentage conversion of nitrous oxide as a function of temperature over $La_{0.8}Sr_{0.2}MO_3$ perovskites.

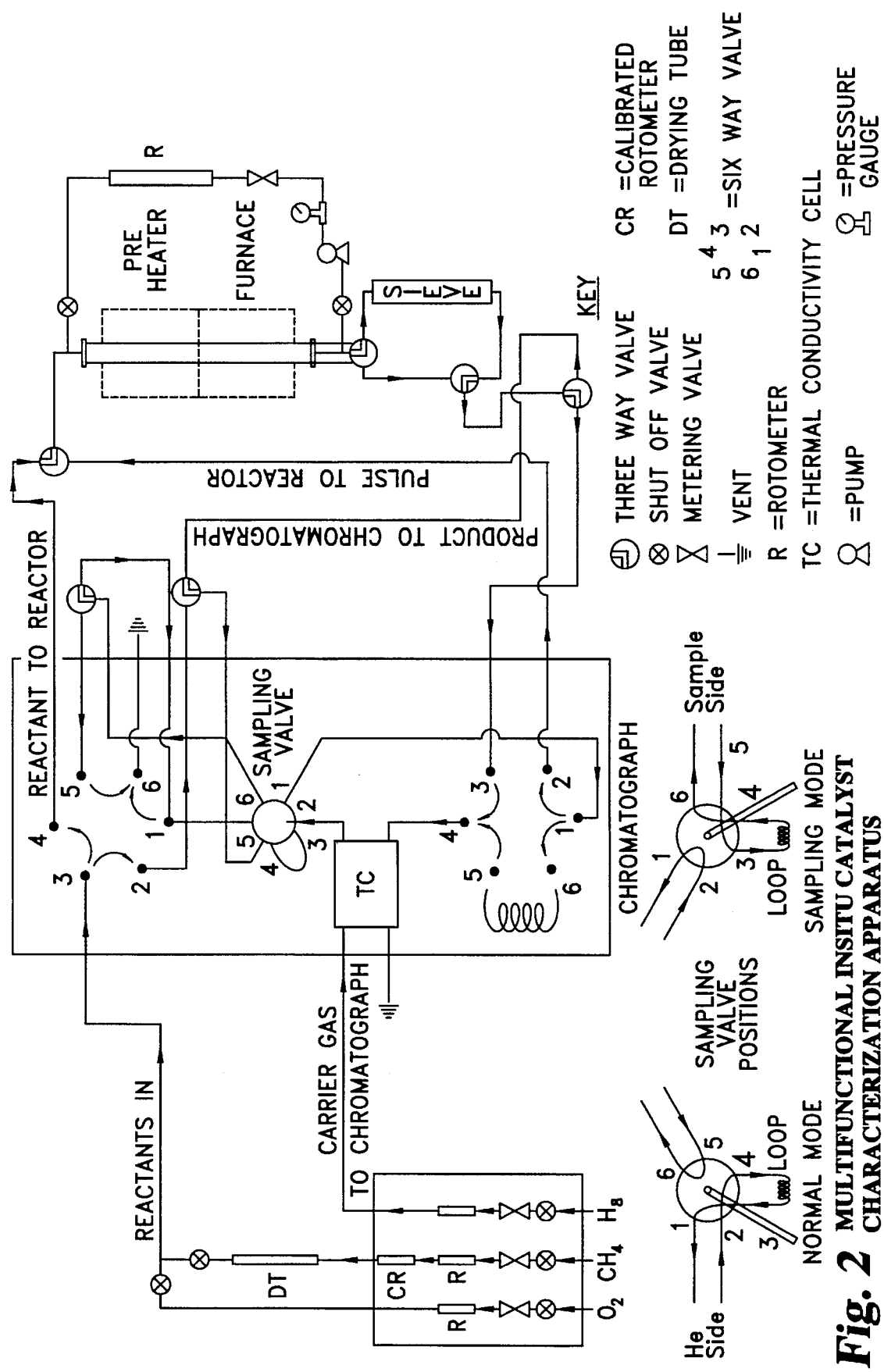
Fig. 2 MULTIFUNCTIONAL INSITU CATALYST CHARACTERIZATION APPARATUS

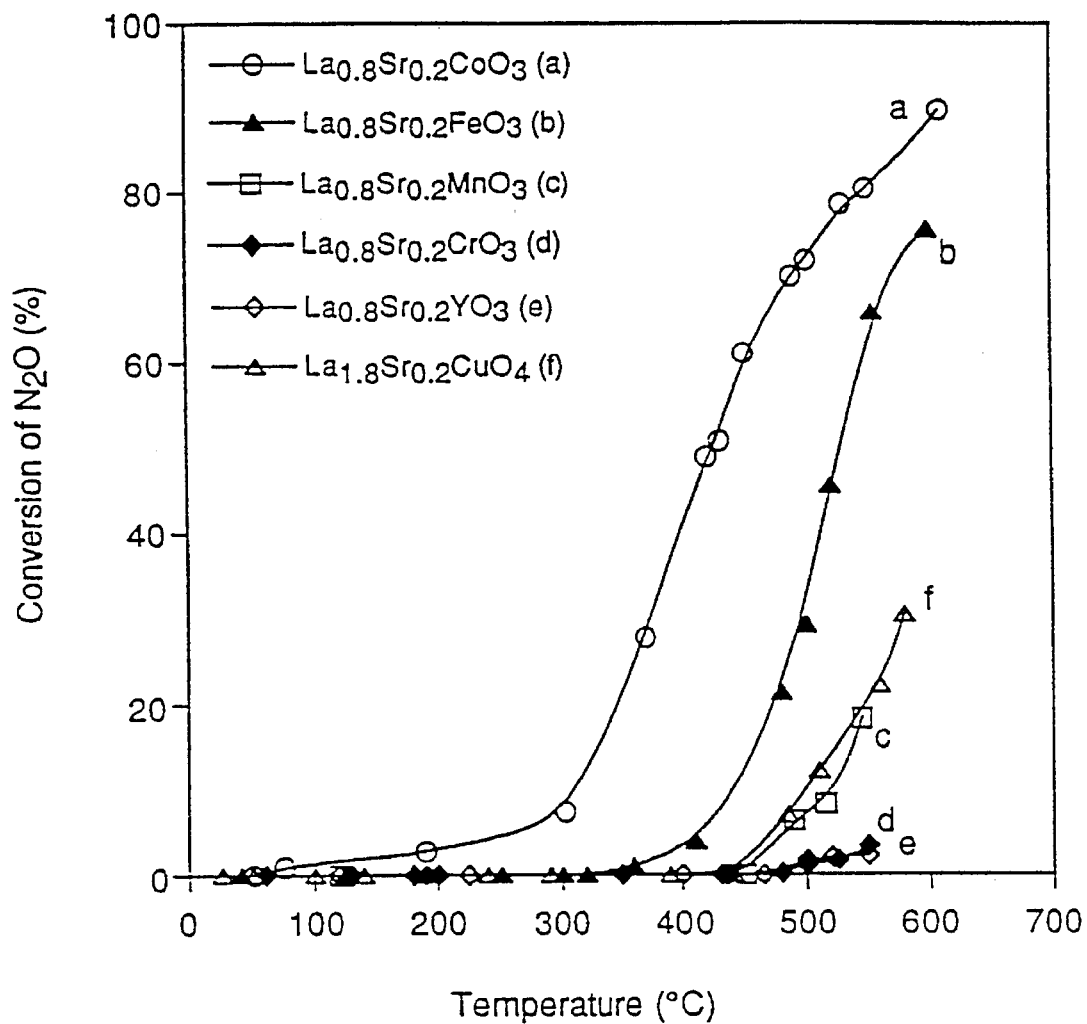
FIG. 3 LOTcurves of percentage conversion of nitrous oxide as a function of temperature over $La_{0.8}Sr_{0.2}MO_3$ perovskites.

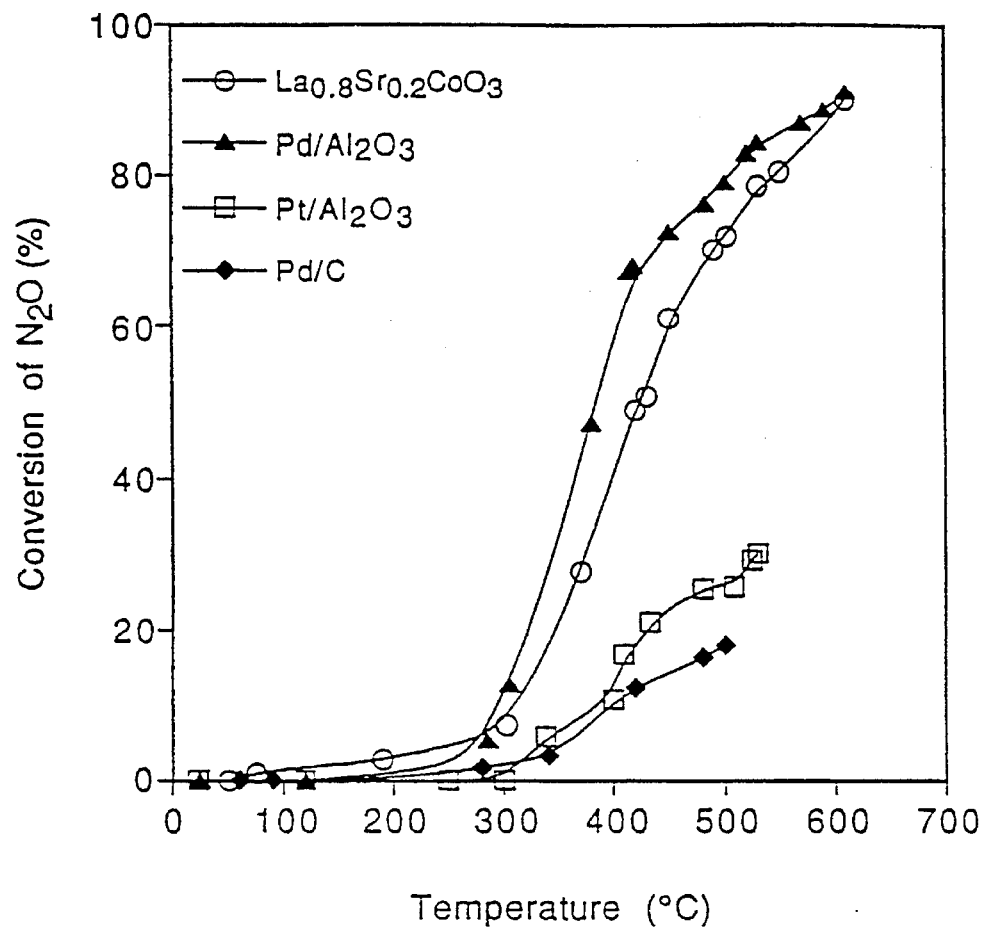
Fig. 4 Comparison of nitrous oxide conversion over cobaltate perovskite with Pd and Pt catalysts.

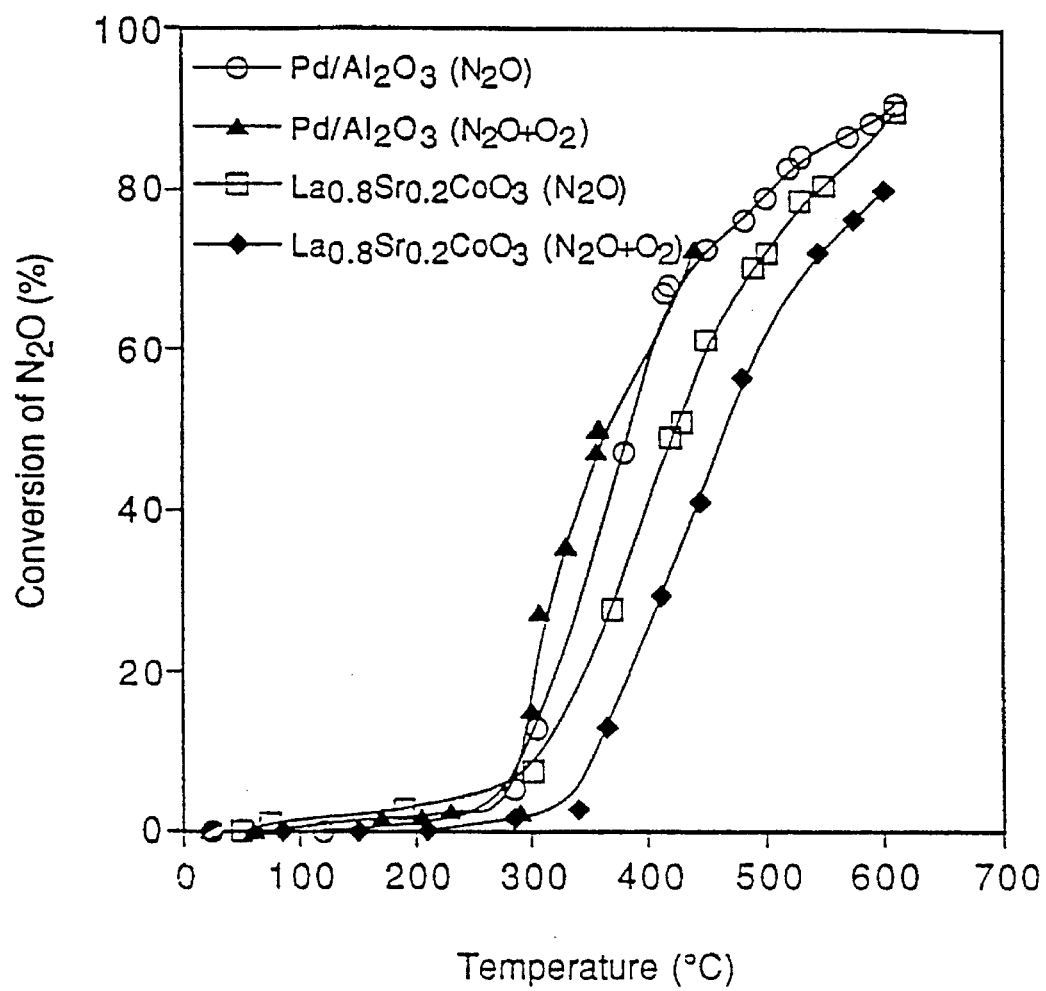
Fig. 5 LOT curves for the decomposition of $N_2O$ over $Pd/Al_2O_3$ and $La_{0.8}Sr_{0.2}CoO_3$ catalysts in the presence of oxygen.

NITROUS OXIDE DECOMPOSITION USING A SOLID OXIDE SOLUTION

FIELD OF THE INVENTION

The present invention relates generally to compositions and methods for reducing $N_2O$ emissions from exhaust gas streams, and more particularly to a solid oxide solution effective for catalytically reducing $N_2O$.

BACKGROUND TO THE INVENTION

The concentration of tropospheric nitrous oxide ($N_2O$) has been increasing globally at an alarming rate, and the environmental consequences of that increase are believed to be potentially serious. For example, increased concentrations of atmospheric $N_2O$ are known to influence stratospheric ozone depletion and may enhance troposheric warming due to the "greenhouse gas" properties of $N_2O$.

Significant sources of atmospheric $N_2O$ include the combustion of fossil fuels, particularly coal and fuel oil, and the generation of $N_2O$ as a by-product from industrial waste treatments and pollution abatement processes. In an attempt to address the potential environmental impact of these man-made sources of $N_2O$, it has long been desired to develop efficient strategies for reducing or eliminating $N_2O$ from such effluent gas streams.

It is known that $N_2O$ decomposes above 1800K in the gas phase into $N_2$ and $O_2$. Catalytic decomposition occurs at much lower temperatures, but also results in the production of oxygen and nitrogen. Thus, it can be seen that the presence of oxygen in the emission stream may inhibit the decomposition of $N_2O$ due to the important role it plays in the kinetics of $N_2O$ decomposition:

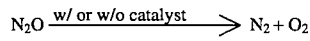

A need therefore exists for a method of reducing $N_2O$ from exhaust gas streams that may additionally contain rate inhibiting amounts of oxygen. The present invention addresses that need.

SUMMARY OF THE INVENTION

Briefly describing one aspect of the present invention, catalytic decomposition of nitrous oxide in the presence of oxygen is achieved using a solid oxide solution of the formula:

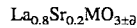

where:
M is a transition metal, and is preferably selected from the group consisting of Cr, Mn, Fe, Co and Y; and
$\partial$ is the deviation from stoichiometric balance; or:

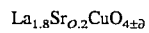

where:
$\partial$ is the deviation from stoichiometric balance.

The solid oxide solution catalyst exhibits catalytic activity for nitrous oxide decomposition which rivals that of a highly dispersed 0.5% Pd on alumina catalyst.

BRIEF DESCRIPTION OF THE DRAWINGS

FIG. 2 shows a multifuctional in situ catalyst characterization apparatus.

FIG. 3 shows the light-off-temperature curves for the precentage conversion of nitrous oxide as a function of temperature over solid oxide perovskities.

FIG. 4 shows the catalytic activity of cobaltate perovskite compared to that of supported noble metal catalysts.

FIG. 5 shows the effect of additional oxygen in the reactant feed over cobaltate perovskite and Pd/Al$_2$O$_3$ catalysts.

DESCRIPTION OF THE PREFERRED EMBODIMENT

Figure 1:
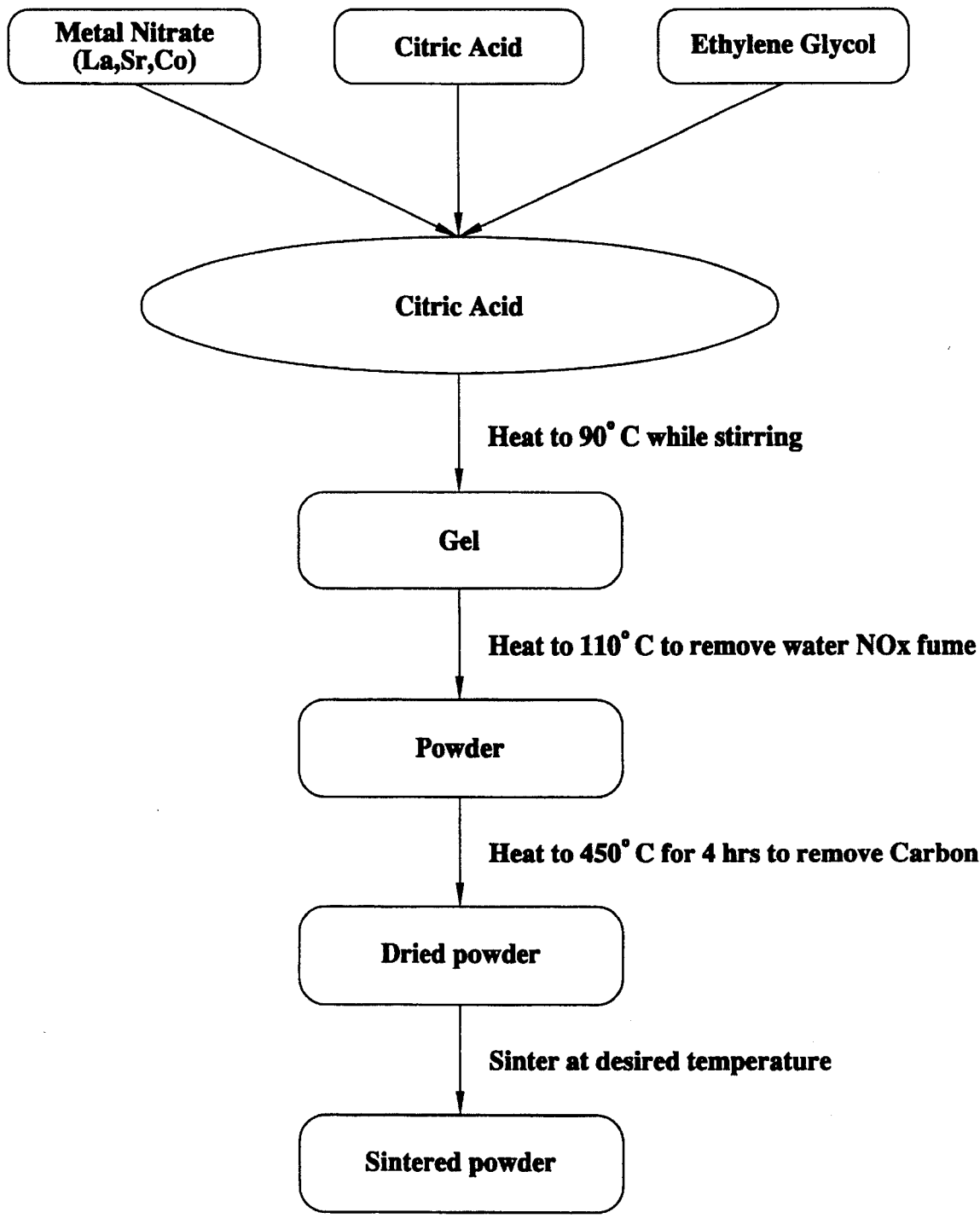
FIG. 1 shows a floor diagram of the preparation of the preferred catalysts and their incorporation into solid oxide solutions.

For the purposes of promoting an understanding of the principles of the invention, reference will now be made to preferred embodiments and specific language will be used to describe the same. It will nevertheless be understood that no limitation of the scope of the invention is thereby intended, such alterations and further modifications in the preferred embodiments, and such further applications of the principles of the invention as described therein, being contemplated as would normally occur to one skilled in the art to which the invention relates.

The present invention relates to the use of solid oxide solutions which rival noble metal catalysts in certain oxidation, reduction and hydrocarbon coupling reactions. More particularly, in one preferred embodiment the present invention uses a family of transition metal perovskite solid oxide solutions of the general formula:

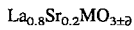

where:
M is a transition metal selected from the group consisting of Cr, Mn, Fe, Co and Y; and
$\partial$ is the deviation from stoichiometric balance;

In another preferred embodiment the present invention uses a metal perovskite solid oxide solution of the formula:

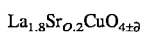

where:
$\partial$ is the deviation from stoichiometric balance.

In all cases these catalysts are shown to perform favorably when compared to commercially available supported noble metal catalysts such as Pt/Al$_2$O$_3$ and Pd/Al$_2$O$_3$.

The catalysts La$_{0.8}$Sr$_{0.2}$MO$_{3\pm\partial}$(M=Cr, Mn, Fe, Co or Y) and La$_{1.8}$Sr$_{0.2}$CuO$_{4\pm\partial}$ are preferably prepared by the Pechini process. That process is generally described in U.S. Pat. No. 3,330,697 to Pechini, which is incorporated herein in its entirety by reference. The preparation of the catalysts is within the level of skill of one skilled in the art, and may be accomplished by such persons without undue experimentation.

A flow diagram showing the preparation of the preferred catalysts and their incorporation into solid oxide solutions is shown in FIG. 1. The chemicals used for the preparation of the catalysts, including lanthanum nitrate, strontium nitrate, transition metal nitrates, citric acid and ethylene glycol, are preferably at least 99.9% pure and are obtainable from commercial sources.

Briefly describing the preparation of the solid oxide solutions, nitrates of lanthanum, strontium and transition metals in de-ionized water are first mixed in the proper proportions. Two moles of citric acid per mole of perovskite are added and the solution is stirred constantly. The solution is heated to 90° C. and ethylene glycol (0.7 times the amount of citric acid by weight) is also added slowly to the solution.

The solution is then heated to 110° C. and maintained at that temperature until all the water is evaporated, resulting in the formation of a gel. The gel is further heated (200°–300° C.) until the nitrates are completely decomposed. The dried powder thus obtained is ground and calcined at 450° C. for 3 hours to remove the organic residues. The resultant oxide is sintered at the desired temperature for the required compound formation.

To describe the invention in detail, reference will be made to specific examples demonstrating the preparation and use of the solid oxide catalysts described above. It is to be understood that the examples are provided to describe the preferred embodiments, and that no limitation to the scope of the invention is intended thereby.

EXAMPLE 1

A gradientless continuous stir tank reactor (CSTR) reactor configuration was used to provide global conversion rate ($R_g$) data directly by a simple material balance. The basic method is taught in C. Serrano and J. J. Carberry, 19 *Appl. Catal.* 119 (1985).

For any kinetic scheme: $R_g = C_f X/q$ where $C_f$ is the feed concentration, X is the conversion, and q is the contact time, as given by:

$$q = \frac{\text{Vol. of catalyst}}{\text{Volumetric flow rate}} \quad \text{or} \quad q = \frac{\text{Weight of the catalyst}}{\text{Volumetric flow rate}}$$

The gradientless (CSTR) condition is realized by any of several laboratory catalytic reactor designs such as a Carberry spinning basket reactor or an internal or external recycle reactor. An external recycle reactor is used in the present inquiry. The active catalysts have also been tested in a plug flow reactor because that design is relatively similar to the application mode. The usual criteria were invoked to ensure the absence of local diffusional (heat and mass) disguises.

Experiments were performed in a multifunctional in situ catalyst characterization unit, an integrated reactor chemisorption apparatus designed for reaction kinetic studies and in situ measurement of gas chemisorption by pulse technique. A diagram of the apparatus used is shown in FIG. 2.

Compound formation was confirmed by X-ray diffraction studies using a Diano X-ray diffractometer with $CuK_\alpha$ radiation. The surface area of all the samples were measured with a Quantachrome single point BET surface area analyzer using 30% nitrogen in helium gas mixture.

Comparison tests using supported noble metal catalysts $Pd/Al_2O_3$ and $Pt/Al_2O_3$ were also performed. The $Pd/Al_2O_3$ and $Pt/Al_2O_3$ catalysts each contained 0.5% metal loading on ⅛ inch alumina pellets.

A reactant feed composition of about 0.5% nitrous oxide in helium was used in the base experiments. Experiments were also conducted with a feed gas composition of 0.5% $N_2O+4\%$ $O_2$ and balance helium on selected catalysts to establish the influence of oxygen on the decomposition reaction. A total constant flow rate of about 100 cc/min and recycle ratio of 30 were maintained on catalytic runs.

The gas composition was analyzed using on-line gas chromatography interphased with an automatic integrator. The activity of the catalysts was obtained by monitoring the fraction of nitrous oxide converted as a function of temperature from 20° to 650° C. Each reading was measured at constant temperature under steady state conditions. Compressed gas tanks of nitrous oxide, oxygen and helium (99.9% purity) were obtained from standard commercial sources.

Table 1 illustrates the preparation conditions of the Sr substituted perovskites, BET surface area and the possible conduction type of the solid oxide solutions in air. The surface area of the material depends on the sintering temperature and time of calcination. The Pechini method of preparation gives relatively high surface area when compared to conventional ceramic techniques.

TABLE 1

Physico-Chemical Data for Perovskite Catalysts.

| Catalyst | Sintering Temp (°C.) | Time (hrs.) | Surface Area ($m^2/g$) | Conduction Type |
|---|---|---|---|---|
| $La_{0.8}Sr_{0.2}CrO_{3\pm\partial}$ | 1100 | 12 | 1.3 | p |
| $La_{0.8}Sr_{0.2}MnO_{3\pm\partial}$ | 1000 | 12 | 2.7 | p, n |
| $La_{0.8}Sr_{0.2}FeO_{3\pm\partial}$ | 1000 | 12 | — | p, n |
| $La_{0.8}Sr_{0.2}CoO_{3\pm\partial}$ | 900 | 6 | 5.1 | p, n |
| $La_{0.8}Sr_{0.2}YO_{3\pm\partial}$ | 1050 | 12 | 2.9 | p, electrolyte |
| $La_{1.8}Sr_{0.2}CuO_{4\pm\partial}$ | 1050 | 12 | 1.8 | p |

The light-off-temperature (LOT) curves for the percentage conversion of nitrous oxide as a function of temperature over solid oxide perovskites are shown in FIG. 3. The reaction conditions and the results obtained are computed in Table 2. It can be seen from the data that only the cobaltate catalyst in the present solid oxide solution series exhibits maximum conversion for the decomposition of nitrous oxide (about 90%) at 600° C.

TABLE 2

Catalytic Data of Nitrous Oxide Decomposition on Strontium-Substituted Perovskites.
Feed Composition: ~0.5% $N_2O$ in Helium
Feed Flow: ~100 ml/min
Recycle Ratio: 30

| Catalyst | Weight (g) | WHSV[1] (cc/h.g) | $N_2O$ (ppm) | Conversion at 500° C. (%) | Global rate (mole/g.s) |
|---|---|---|---|---|---|
| $La_{0.8}Sr_{0.2}CrO_{3\pm\partial}$ | 0.232 | 25940 | 5350 | 0.5 | $2.50 \times 10^{-9}$ |
| $La_{0.8}Sr_{0.2}MnO_{3\pm\partial}$ | 0.265 | 24170 | 5340 | 8.3 | $1.20 \times 10^{-7}$ |
| $La_{0.8}Sr_{0.2}CoO_{3\pm\partial}$ | 0.253 | 24960 | 4095 | 72.2 | $6.88 \times 10^{-7}$ |

TABLE 2-continued

Catalytic Data of Nitrous Oxide Decomposition on Strontium-Substituted Perovskites.
Feed Composition: ~0.5% $N_2O$ in Helium
Feed Flow: ~100 ml/min
Recycle Ratio: 30

| Catalyst | Weight (g) | WHSV[1] (cc/h.g) | $N_2O$ (ppm) | Conversion at 500° C. (%) | Global rate (mole/g.s) |
|---|---|---|---|---|---|
| $La_{0.8}Sr_{0.2}YO_{3\pm\partial}$ | 0.229 | 26670 | 4580 | 0.5 | $4.06 \times 10^{-8}$ |
| $La_{1.8}Sr_{0.2}CuO_{4\pm\partial}$ | 0.305 | 20340 | 4630 | 12.2 | $1.31 \times 10^{-7}$ |

[1]Weight Hour Space Velocity (WHSV) is used to give greater accuracy than Volume Hour Space Velocity (VHSV) in the low volume range. The CSTR reactor takes care of the gradientless condition in the low volume catalyst scouting.

EXAMPLES 6–12

The catalytic activity of cobaltate perovskite is compared with that of the supported noble metal catalysts in FIG. 4. Though significant differences are observed in the activities of the solid oxide solution and the supported Pd catalyst at lower temperature (<500° C.), the activities are substantially the same at temperatures near 600° C. The difference observed among the Pd and Pt noble metals may be due to the inhibition of product oxygen in the overall decomposition process. Oxygen inhibition is significant in the case of Pt.

The effect of additional oxygen in the reactant feed over cobaltate perovskite and $Pd/Al_2O_3$ catalyst for the decomposition of nitrous oxide is shown in FIG. 5 and Table 3. Negligible inhibition was observed on the conversion of nitrous oxide due to the presence of oxygen over these catalysts.

The results obtained on the $La_{0.8}Sr_{0.2}MO_{3\pm\partial}$ series indicate that oxygen desorption may be the rate controlling step. Conductivity, oxygen diffusion coefficient and nonstoichiometry of these oxides are well known to contribute to the catalytic activity of the SOS systems. See, e.g., S. Rajadurai, B. Li, C. B. Alcock and J. J. Carberry, 131 *J. Catal.* 582–89 (1991).

TABLE 3

Comparison of Pd and Cobaltate Catalysts for Nitrous Oxide Decomposition in the Presence of Oxygen in the Feed Mixture.
Feed Composition: ~0.7% $N_2O$ + ~4.0% $O_2$ + balance Helium
Feed Flow: ~100 ml/min
Recycle Ratio: 30

| Catalyst | $N_2O$ Content (%) | $O_2$ Content (%) | Conversion at 500° C. (%) | Global (moles/q.s) |
|---|---|---|---|---|
| $Pd/Al_2O_3$ | 0.452 | — | 79.1 | $1.96 \times 10^{-6}$ |
| $Pd/Al_2O_3$ | 0.515 | 4.188 | 78.5 | $2.56 \times 10^{-6}$ |
| $La_{0.8}Sr_{0.2}CoO_3$ 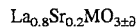 | 0.409 | — | 74.8 | $1.04 \times 10^{-6}$ |
| $La_{0.8}Sr_{0.2}CoO_3$ 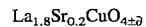 | 0.422 | 4.236 | 62.0 | $9.91 \times 10^{-7}$ |

It can be seen that $La_{0.8}Sr_{0.2}CrO_{3\pm\partial}$ exhibits low catalytic activity for the nitrous oxide decomposition reaction even though it shows very high conductivity among the $La_{0.8}Sr_{0.2}MO_{3\pm\partial}$ oxides. $La_{0.8}Sr_{0.2}YO_{3\pm\partial}$ also showed very low conversion of nitrous oxide decomposition though it has been reported as a mixed conductor. Thus ionic or electronic conductivities may not play a direct role in the decomposition of nitrous oxide on these oxide systems.

Cobaltate is found to be active for the decomposition of nitrous oxide. The nonstoichiometry due to anionic and cationic vacancies is well known in this system. Thus the activity of $La_{0.8}Sr_{0.2}CoO_{3\pm\partial}$ may be related to the nonstoichiometry and the availability of high oxygen vacancies in the compound.

In sum, the laboratory study demonstrates that the solid oxide solution $La_{0.8}Sr_{0.2}CoO_{3\pm\partial}$ and supported $Pd/Al_2O_3$ catalysts are active for the decomposition of nitrous oxide in the presence of oxygen.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for reducing $N_2O$ in an exhaust gas stream, comprising contacting a $N_2O$-containing exhaust gas with a solid oxide solution of the formula:

$$La_{0.8}Sr_{0.2}MO_{3\pm\partial}$$

where:

M is a member selected from the group consisting of Cr, Fe, Co and Y; and $\partial$ is the deviation from stoichiometric balance;

wherein said contacting occurs for a time and at a temperature effective for $N_2O$ reduction.

2. The method of claim 1 wherein M is Co.

3. A method for reducing $N_2O$ in an exhaust gas stream, comprising contacting a $N_2O$-containing exhaust gas with a solid oxide solution of the formula:

$$La_{1.8}Sr_{0.2}CuO_{4\pm\partial}$$

where:

$\partial$ is the deviation from stoichiometric balance; wherein said contacting occurs for a time and a temperature effective for $N_2O$ reduction.

4. The method of claim 3 wherein said contacting step comprises contacting an exhaust gas stream containing both $N_2O$ and $O_2$ with said solid oxide solution.

* * * * *

UNITED STATES PATENT AND TRADEMARK OFFICE
CERTIFICATE OF CORRECTION

PATENT NO. : 5,562,888
DATED      : October 8, 1996
INVENTOR(S): Sivanandi Rajadurai It is certified that error appears in the above-identified patent and that said Letters Patent is hereby corrected as shown below:

On the title page:

Item [57] on the title page, line 15, "The" should begin a new paragraph.

In col. 2, line 10, please change "perovskities" to --perovskites--.

In col. 2, line 42, please change ";" to --.--.

In col. 5, Table 3, line 52, please change "(moles/q.s)" to --(moles /g.s)--.

In col. 5, Table 3, line 54, please change "2.56" to --2.51--.

Signed and Sealed this

Fifteenth Day of July, 1997

Attest:

BRUCE LEHMAN

Attesting Officer

Commissioner of Patents and Trademarks